United States Patent [19]
Martin

[11] 3,822,534
[45] July 9, 1974

[54] FRONT MOUNTED HARVESTER

[75] Inventor: Virgil B. Martin, West Bend, Wis.

[73] Assignee: Gehl Company, West Bend, Wis.

[22] Filed: Jan. 9, 1973

[21] Appl. No.: 322,129

[52] U.S. Cl.................... 56/13.9, 56/14.9, 56/15.8
[51] Int. Cl............................................ A01d 45/02
[58] Field of Search ......... 56/13.3, 13.5, 13.9, 14.3, 56/14.9, 15.8, 2

[56] References Cited
UNITED STATES PATENTS

| | | | |
|---|---|---|---|
| 2,811,004 | 10/1957 | Borrow | 56/13.9 X |
| 3,425,194 | 2/1969 | Scott et al | 56/14.9 |
| 3,664,098 | 5/1972 | Thor | 56/13.9 |
| 3,665,686 | 5/1972 | Duncan | 56/14.3 X |

*Primary Examiner*—Antonio F. Guida
*Assistant Examiner*—J. N. Eskovitz
*Attorney, Agent, or Firm*—James E. Nilles

[57] ABSTRACT

Flexibility between a tractor and a front mounted harvester unit is provided by an articulated connecting linkage which positions the harvester unit in longitudinally aligned, vertically floating and laterally tiltable relation to the tractor. Crop material cut by the harvester unit is discharged into a trailing wagon through a deflector which extends upwardly from the harvester unit and rearwardly over the tractor, the connecting linkage functioning automatically to keep the deflector aimed into the wagon while the harvester unit floats up and down and tilts laterally relative to the tractor.

10 Claims, 15 Drawing Figures

FRONT MOUNTED HARVESTER

BACKGROUND OF THE INVENTION

The invention relates to harvesting machinery and it is concerned more particularly with the gathering and chopping of ensilage crop such as corn or grass, and with the collecting of the chopped crop in a receptacle during the harvesting operation.

Attempts have heretofore been made to provide a crop gathering and chopping unit which can be mounted on a tractor in a forward position, and which is equipped with an upwardly and rearwardly extending deflector structure through which chopped crop material may be discharged into a trailing wagon. Such a crop gathering and chopping unit is disclosed for instance, in U.S. Pat. No. 3,664,098 issued on May 23, 1972 to Charles C. Thor for Removable Silage Chopper.

One of the difficulties which have heretofore been encountered is providing a satisfactory front mounted harvester attachment for a standard farm tractor has been due to the pitching and rolling to which the tractor and attachment become subjected during travel in the field. Elements of the coupling connections between the tractor and harvester unit, as heretofore constructed, have been apt to fail due to excessive stresses developed during field travel of the tractor and harvester attachment over uneven ground.

Another difficulty which has heretofore been encountered in operating a tractor with a front mounted ensilage harvester and a trailing wagon has been the tendency of the deflector to swing from its aimed position for discharge into the wagon when the tractor and harvester unit oscillate relative to each other during travel over uneven ground. As a result of such swinging of the deflector, its rearwardly extending part may hit the roof of the tractor cab, or its discharge end may be displaced sufficiently so that the ejected crop material will miss the inlet to the wagon.

SUMMARY OF THE INVENTION

Generally, it is an object of the invention to provide an improved tractor-harvester combination.

More specifically, it is an object of the invention to provide an articulated connection between a tractor and a front mounted harvester unit which affords the necessary degree of flexibility to accommodate any relative movements within practical operational limits.

A further object of the invention is to provide an articulated connection of the above mentioned character which will automatically minimize the relative vertical motion between the rearward portion of the deflector and the tractor cab.

A still further object of the invention is to provide an articulated connection between a tractor and a front mounted harvester unit which will function automatically to keep the discharge end of the deflector substantially aimed into the inlet of a hooded trailing wagon, while the tractor and harvester unit move up and down and tilt laterally relative to each other during field travel over uneven ground.

These and other objects and advantages of the present invention will appear hereinafter as this disclosure progresses, reference being had to the accompanying drawings.

DESCRIPTION OF A PREFERRED EMBODIMENT

Figure 1:
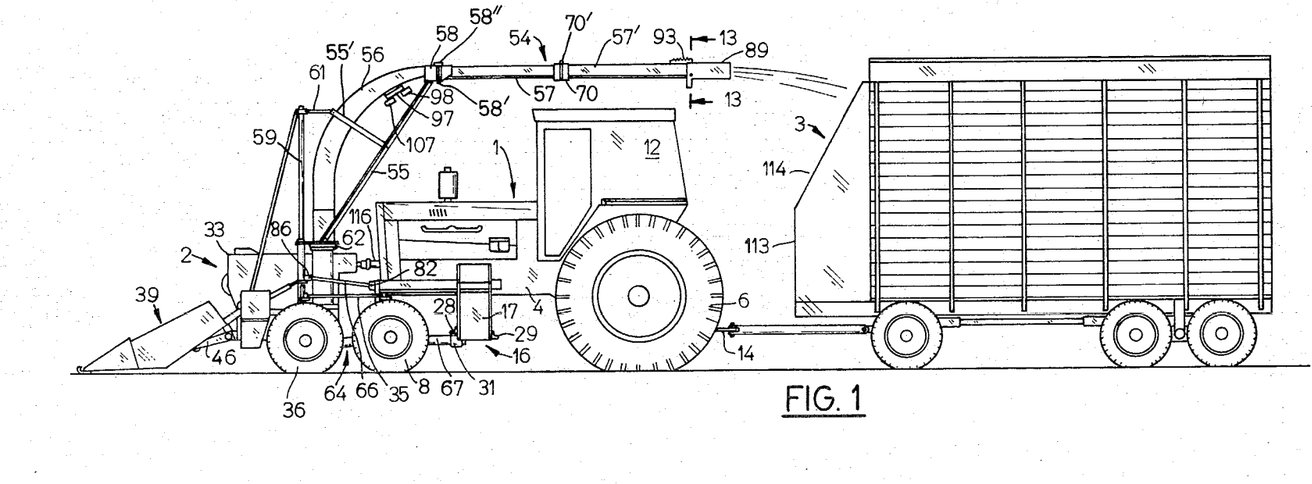
FIG. 1 is a side elevation of harvesting equipment embodying the invention.
Figure 2:
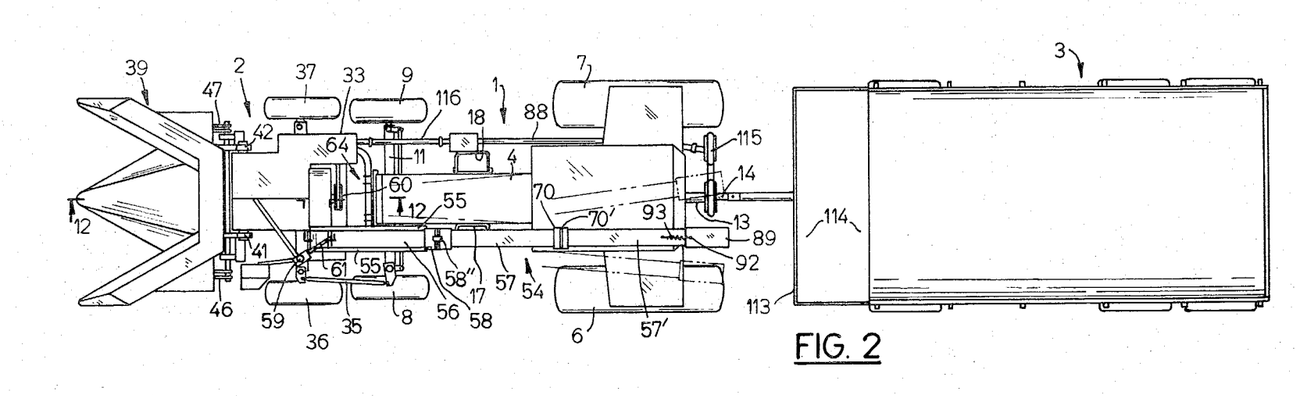
FIG. 2 is a top view of the equipment shown in FIG. 1.

As shown in FIGS. 1 and 2, a farm tractor 1, a front mounted harvester unit 2, and a trailing wagon 3 are coupled together for travel as a unit and operation in the field by one man.

The tractor 1 is a conventional farm tractor comprising a body structure 4 supported on power driven rear wheels 6 and 7, and on steerable front wheels 8 and 9 at the opposite ends of a rockable front axle 11. An operator's cab 12 at the rear end of the body 4 is of sufficient height to provide standing room for an operator, and the usual power takeoff shaft 13 and drawbar 14 extend rearwardly from the rear axle housing of the tractor.

Figure 3:
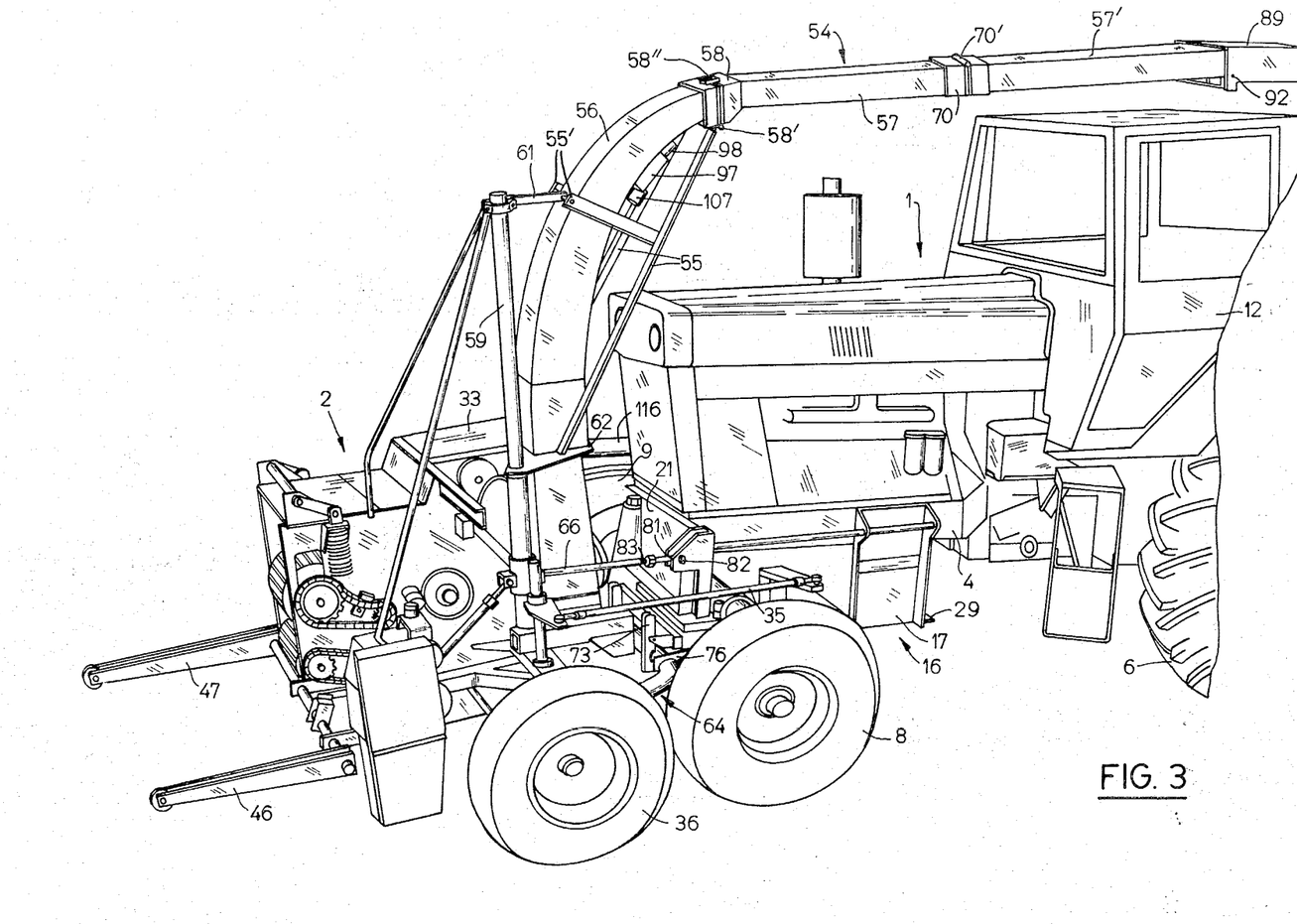
FIG. 3 is a perspective view looking at part of the equipment shown in FIG. 1 from the left side of the tractor.
Figure 4:
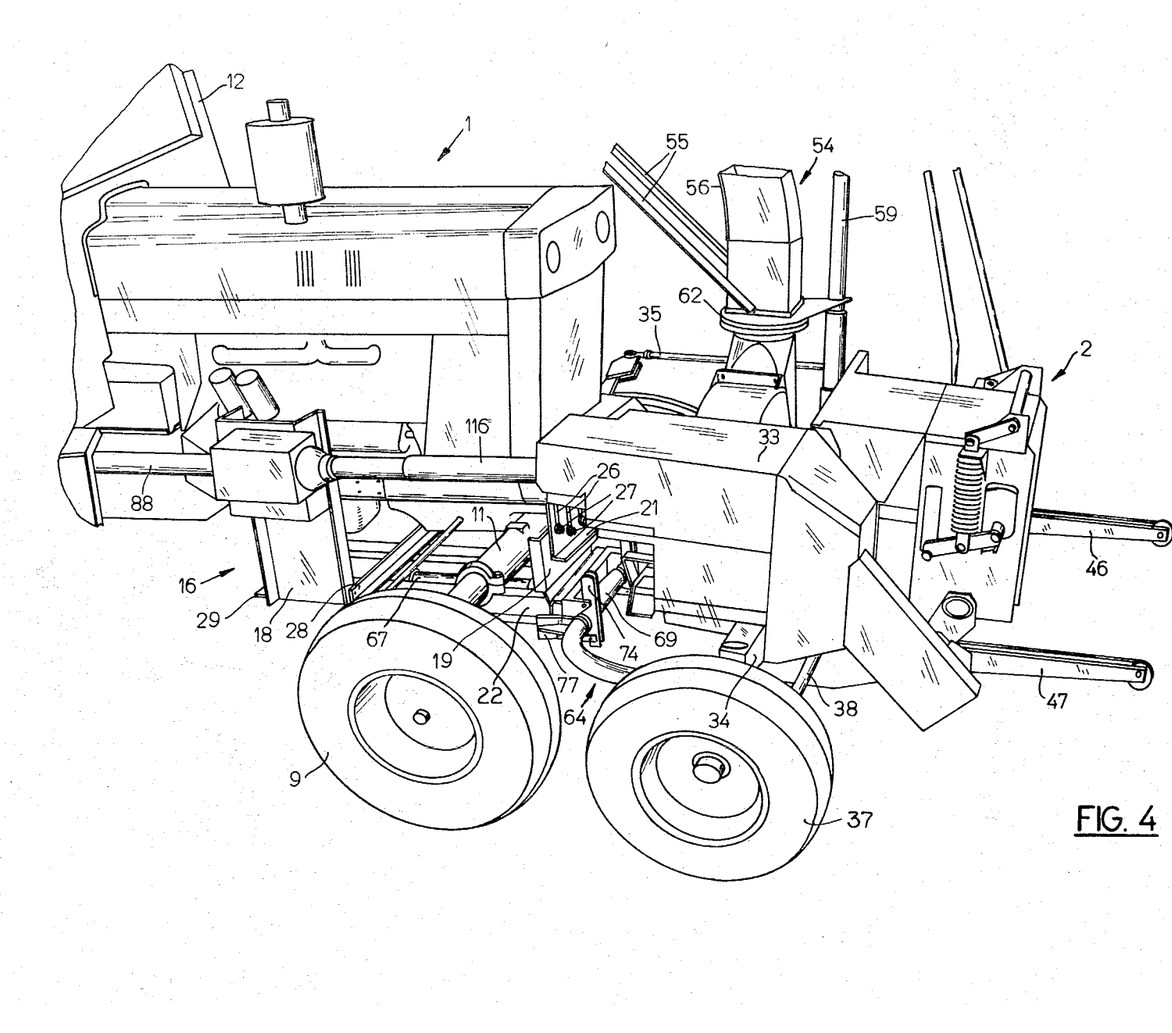
FIG. 4 is a perspective view looking at the part of the equipment shown in FIG. 3 from the right side of the tractor.
Figure 5:
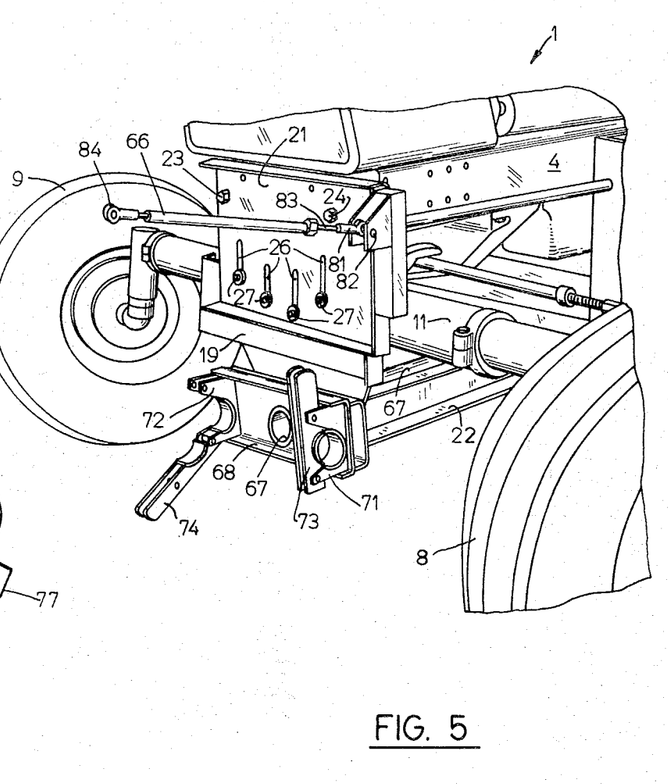
FIG. 5 is a perspective view showing tractor mounted parts of an articulated connection between the tractor and harvester unit shown in FIG. 1.

An auxiliary frame structure, generally designated by the reference numeral 16, is secured to the tractor body 4 in underslung relation to the forward part thereof. As shown in FIGS. 3 and 4, the auxiliary frame structure 16 comprises left and right rear hanger brackets 17 and 18, a front hanger bracket having a lower part 19 and an upper part 21, and a fore and aft extending bottom assembly 22 secured at its rear end to the hanger brackets 17 and 18, and at its front end to the lower part 19 of the front hanger bracket. As shown in FIG. 5, the upper part 21 of the front hanger bracket is secured to the tractor body 4 by cap screws 23 and 24, and the lower part 19 is secured in up and down adjustable relation to the upper part by means of slots 26 and bolts 27.

Figures 10, 13:
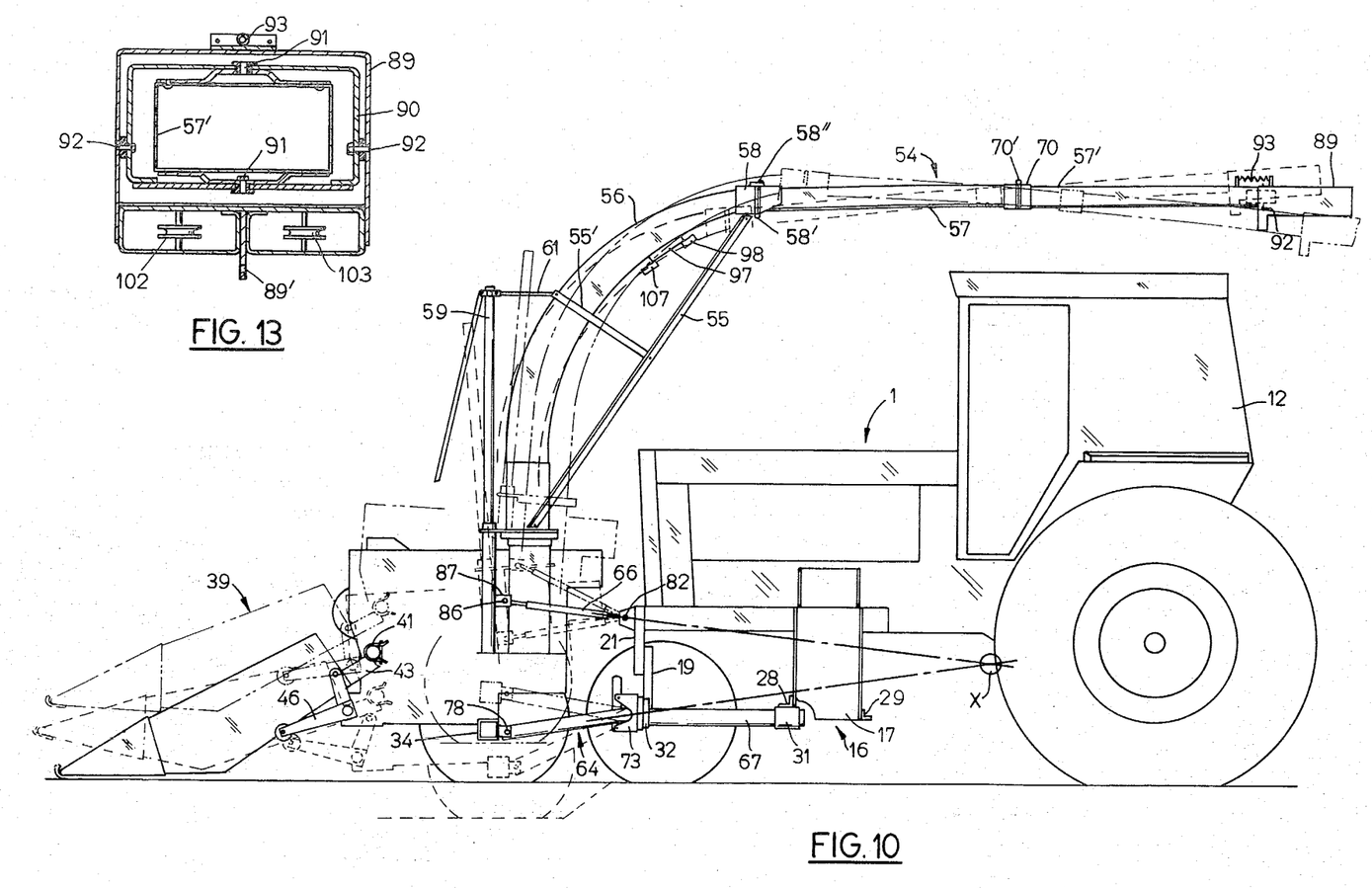
FIG. 10 is a schematic view similar to FIG. 7, with the harvester unit shown in different positions of adjustment.
FIG. 13 is an enlarged sectional view along line 13—13 in FIG. 1.
Figure 11:
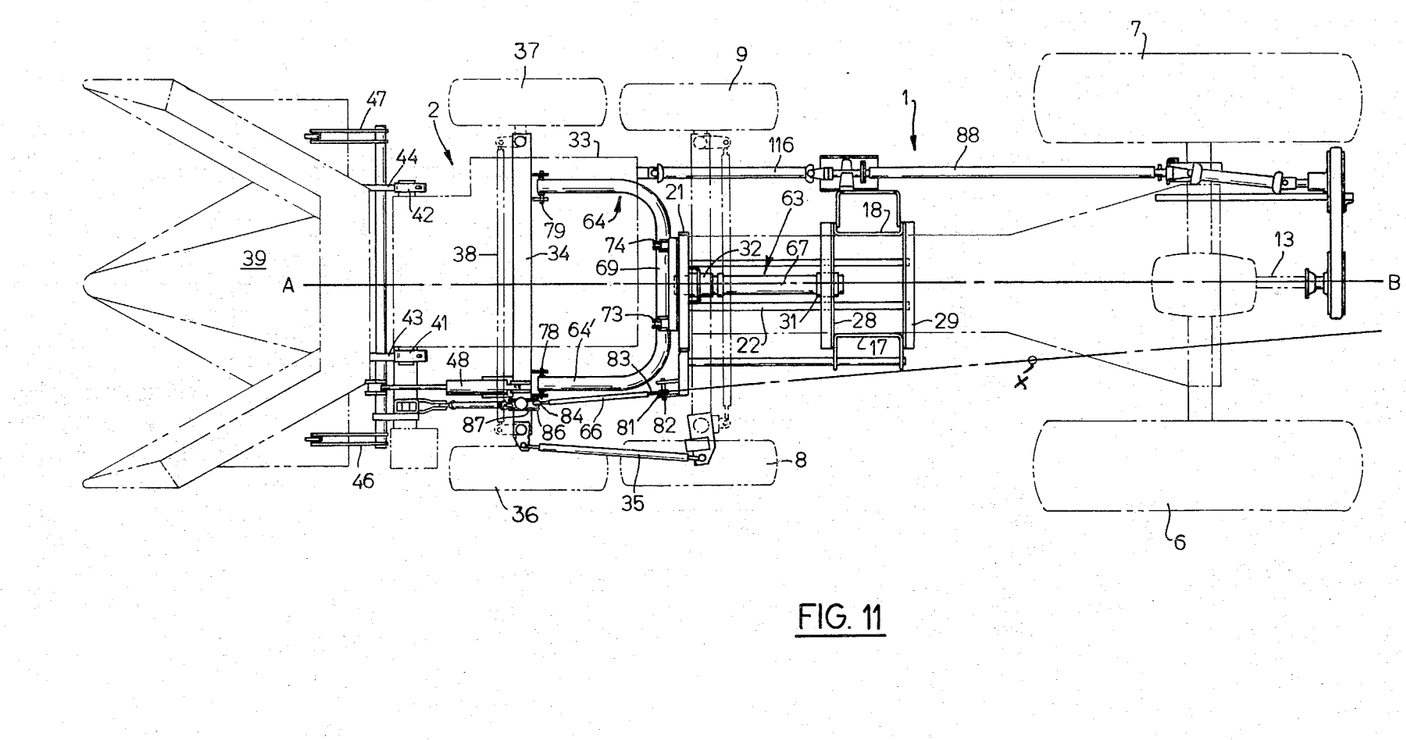
FIG. 11 is a top view of FIG. 10, certain parts being removed.

Referring to FIGS. 10 and 11, the rear hanger brackets 17 and 18 are connected together at their lower ends by forward and rearward cross beams 28 and 29, and a journal bearing 31 is secured to the underside of the cross beam 28 midway between the hanger brackets 17 and 18. Another journal bearing 32 in axial alignment with the bearing 31 is secured to the rear side of the lower front hanger part 19.

The harvester unit 2 in front of the tractor comprises a chopper housing 33; a transverse axle beam 34 rigidly secured to the underside of the housing 33; a pair of supporting wheels 36, 37, steerably mounted at the opposite ends of the axle beam 34 and operatively interconnected by a tie rod 38, and a two row corn gathering attachment 39 in front of the chopper housing 33. Reach rod 35 (FIGS. 3 and 11) is operatively interposed at one side of the machine between the steering knuckle of the tractor front wheel 8 and the steering knuckle of the harvester wheel 36, so that the harvester wheels 36 and 37 will move conjointly with the tractor front wheels 8 and 9 when steering motion is transmitted to the latter from the tractor cab 12 through conventional steering linkage not shown.

A pair of laterally extending, aligned pins 41, 42 on the chopper housing 33 are pivotally embraced by a pair of coupling arms 43, 44, respectively, which are rigidly connected to and extend rearwardly from the corn gathering attachment 39. The rear ends of the coupling arms 43, 44 are bifurcated for drive in engagement with the pins 41, 42 and detachable connection thereto, and the crop gathering attachment is adjustable up and down about the axis of the pins 41, 42 by means of bell crank levers 46 and 47 (FIGS. 7 and 11) and a hydraulic cylinder 48.

The corn gathering attachment 39 is constructed and operates in the well known manner to sever cornstalks from the ground and to feed them endwise into the chopper housing 33. Processing of the cornstalks within the housing 33 likewise conforms with well known principles. The stalks with their foliage and ears are fist compressed by a pair of pressure rollers 49, then advanced by a pair of feed rollers 51 into a high speed cutting cylinder 52 which chops them into small pieces and delivers them into a centrifugal blower 53.

Figure 6:
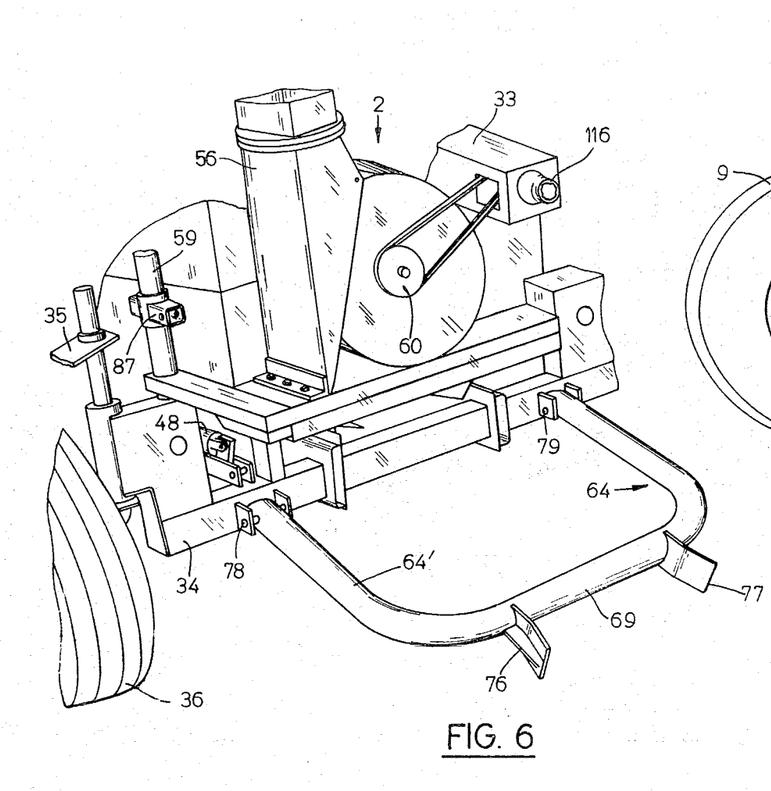
FIG. 6 is a perspective view showing harvester mounted parts of the articulated connection between the tractor and harvester unit shown in FIG. 1.
Figures 12, 14:
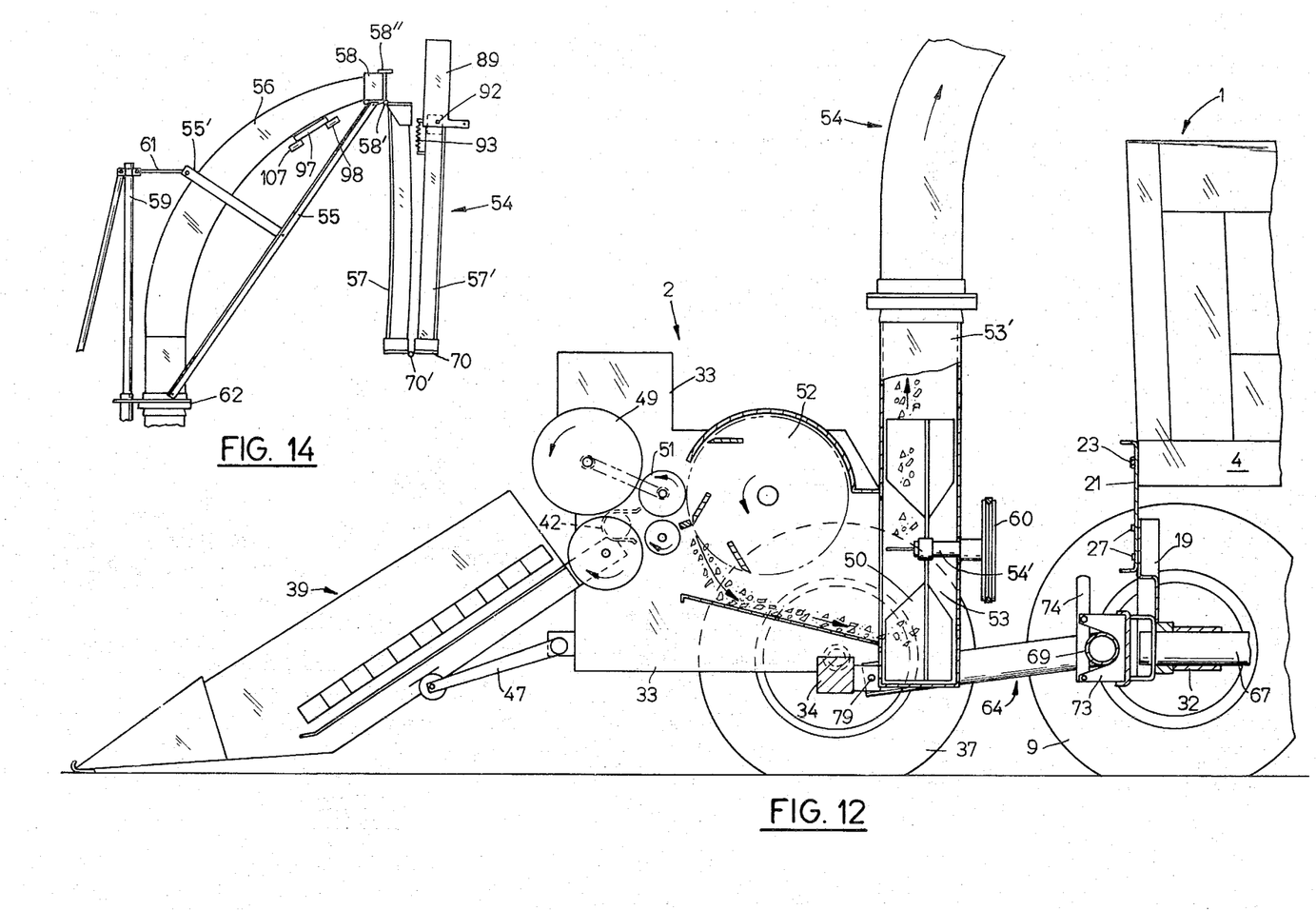
FIG. 12 is a sectional view along line 12—12 in FIG. 2.
FIG. 14 is an elevational view of a deflector assembly in folded condition.

As shown in FIGS. 6 and 12, the rear part of the chopper housing 33 is suitably constructed to provide a spiral housing for the blower 53, and an exhaust stack 53' which extends upwardly from the blower housing. A paddle wheel 50 within the blower housing is driven by a belt drive 60 from shafting 88 which will be described more fully hereinbelow.

In operation, the paddle wheel 50 discharges a strong air blast along with the chopped crop material into the exhaust stack 53'. Adjustably secured on top of the stack 53' by means of a ring joint 62 is an upwardly and rearwardly extending deflector assembly 54 through which the air blast and chopped crop material are conveyed toward the trailing wagon 3.

The deflector assembly 54 comprises a curved front section 56, a straight tubular section 57, a straight tubular extension 57', and a cap 89 at the rear end of the extension 57'. A hinge joint 58 between the deflector sections 56 and 57 provides a horizontal hinge axis 58' at the underside of the deflector assembly, and a hinge joint 70 between the deflector sections 57 and 57' provides a horizontal hinge axis 70' at the upper side of the deflector assembly, the purpose being to permit folding of the deflector assembly into a collapsed condition as illustrated by FIG. 14. In the unfolded condition of the deflector assembly as shown in FIG. 3, the hinge joint 58 is locked by a suitably arranged releasable latch 58''.

A support structure for the curved deflector section 56 comprises a mast 59 which is secured in a vertical position on the chopper housing 33; a slanting brace 55 which extends between the lower and upper ends of the deflector section 56; a pair of struts 55' extending from the brace 55 past opposite sides of the deflector section 56; and a tie bar 61 between the upper end of the mast 59 and the rear ends of the struts 55'. When it is desired to collapse the deflector assembly as shown in FIG. 14 the unfolded assembly is first turned about the ring joint 62 to one side of the tractor, and after the hinge joint 58 has been unlocked the sections 57 and 57' are then swung into vertical positions and locked together by suitable means, not shown. With the deflector assembly in its collapsed condition it can easily be cleaned of crop material that might have become clogged in it, and travel of the assembled equipment to and from the field is also faciliated.

The cap 89 at the discharge end of the deflector section 57' is mounted for up and down and for lateral back and forth movement by means of a gimbal joint which is shown in section in FIG. 13. At the top and bottom of the deflector section 57' axially aligned vertical pivots 91 support a tubular swivel section 90 of rectangular cross section, and at the opposite sides of the swivel section 90 axially aligned horizontal pivots 92 support the cap 89 on the swivel section 90. At the upper side of the cap 89 a spring 93 is connected at its opposite ends to the cap and to the deflector section 57' so as to bias the cap upwardly about the axis of the horizontal pivot pins 92. At its under-side the cap 89 has a depending actuating arm 89' from which a rope 94 leads to an electrically operated control mechanism to be described later.

Propelling power is transmitted from the tractor 1 to the harvester unit 2 by an articulated connection which comprises a generally T-shaped coupling member 63 (FIG. 11), a bail shaped coupling member 64, and a guide link 66. The stem portion 67 (FIG. 7) of the coupling member 63 is embraced by the journal bearings 31, 32 which are mounted on the auxiliary frame structure 16 so as to rotatably position the stem portion in lengthwise extending relation to the tractor and so as to place the transverse head portion 68 (FIG. 5) of the coupling member 63 next to the forward end of the tractor.

The bail shaped coupling member 64 has a bight portion 69 which is journalled on the head portion 68 of the T-shaped coupling member for pivotal movement on an axis which extends transversely to the axis of the journal bearings 31 and 32. To provide for the pivoting of the bail 64 on the T-shaped coupling member 63, end brackets 71 and 72 (FIG. 5) on the head portion 68 are semi-circularly recessed, and latches 73 and 74 with complementary semi-circular recesses are pivoted on the brackets 71, 72, respectively, and releasably lockable thereon to embrace the bight portion 69 of the bail 64 at transversely spaced portions thereof. The bail 64 is secured against lateral shifting in the end brackets 71, 72 by lugs 76, 77 which are secured to the bight portion 69 at a transverse spacing from each other which will place them close to the outer sides of the end brackets 71, 72 while the latter and the bail are in cooperative engagement with each other. The free ends of the bail 64 (FIG. 6) are pivotally connected to the axle beam 34 of the harvester unit by pivot pins 78, 79 which are in axial alignment with each other transversely of the harvester unit.

The guide link 66 (FIGS. 3, 7 and 11) is swingably connected at its opposite ends to the auxiliary frame structure 16 and to the harvester unit 2 in vertically spaced relation to the bail shaped coupling member 64. As shown in FIG. 5, a rear end section 81 of the link 66 is supported by a ball and socket joint for universal swinging movement on a horizontal pin 82 near the upper left hand corner of the front hanger part 21. A stem part of the link section 81 has a screw threaded connection 83 with a forwardly extending rod section to provide for length adjustment of the link, and the forward end section 84 of the link is supported by another ball and socket joint for universal swinging movement on a horizontal pin 86 in a bracket 87 at the lower end of the mast 59. The universal front and rear supporting connections of the guide link 66 are arranged so as to position the link 66 generally in elevated relation to the bail shaped coupling member 64 and in lateral proximity to the vertical plane of swinging movement of the left bail arm 64'. More particularly, the rearward universal connection at 82 (FIG. 10) between link 66 and the auxiliary frame structure 16 is located at a predetermined elevation with respect to the longitudinal axis on which the T-shaped coupling member 63 is swingable in the bearings 31, 32 relative to the auxiliary frame structure 16. Further, the forward universal connection at 86 (FIG. 10) between the guide link 66 and the harvester unit 2 is located at a predetermined elevation with respect to the axis of the pivot pins 78, 79 (FIG. 11) on which the bail 64 is pivoted to the harvester unit. Comparing the elevation at which the rear pivot connection 82 is located above the axis of the bearings 31, 32, with the elevation at which the front pivot connection 86 is located with respect to the axis of the pivot pins 78, 79, it will be seen that the two elevations are unequal, the rearward one being considerably shorter than the forward one. As result, the rearwardly projected axis of the link 66 intersects a rearwardly projected plane through the axis of the pivot pins 78, 79 and through the axis of the bail bight portion 69 at a rearward intersection point which is marked X in FIGS. 7, 10 and 11. The point X represents a virtual pivot center on which the harvester unit 2 is swingable up and down during field travel as will be discussed more fully hereinbelow.

Referring again to FIG. 11, a vertical longitudinal center plane through the tractor and the harvesting unit is indicated by the dash-dotted line A–B. It will be noted that the rearward pivot connection at 81 between the link 66 and the auxiliary frame structure 16 is spaced from the plane A–B a shorter transverse distance than the forward pivot connection at 84. As a result, the rearwardly projected axis of the link 66 is disposed in acute angle relation to the plane A–B, which is helpful to keep the discharge end of the deflector section 57 aimed into the wagon 3 when the harvester unit tilts laterally (FIG. 15) relative to the tractor during field travel as will be discussed more fully hereinbelow.

The wagon 3 is hitched to the tractor drawbar 14 and suitably constructed to accumulate a relatively large quantity of chopped crop material. The sides, rear and top of the wagon box are closed, and the front is partly closed by a low front wall 113 which leaves a generally rectangular material inlet opening 114 above its upper edge and below the roof of the box which is somewhat higher than the roof of the tractor cab 12.

Driving power for the chopping mechanism and for the stalk gathering mechanism of the corn gathering attachment 39 is obtained from the tractor power take-off shaft 13 by means of a rearward chain drive 115, forwardly extending shafting 88 along the right side of the tractor, and telescopic shafting 116.

In operation, the crop is harvested during forward travel of the tractor, and the chopped crop material is discharged from the rearward deflector section 57' into the inlet opening of the wagon. In order to regulate the direction of the crop discharge the cap 89 on the rearward deflector section 57 is adjustable up and down about the horizontal pivot axis 92, and sidewise about the vertical pivot axis 91 of the gimbal joint shown in FIG. 13. The rop 94 extends from the depending arm 89' of the cap along the underside of the deflector sections 57, 57' and is attached to a small winding drum 96 (FIG. 9) in a bracket 97 secured to the deflector section 56. An electric motor 98 is suitably geared to the drum 96 and an electric circuit which connects the motor to the tractor battery includes a double pole, double throw switch 99 symbolically shown in FIG. 9 and actually located in the operator's cab 12. Operation of the switch 99 in one direction causes the motor 96 to pull on the rope 94 and swing the cap 89 down about its pivot axis 92, and operation of the switch 99 in the other direction causes the motor 96 to slacken the rope 94 so that the cap will be swung upward by the spring 93.

Figures 7, 8, 9:
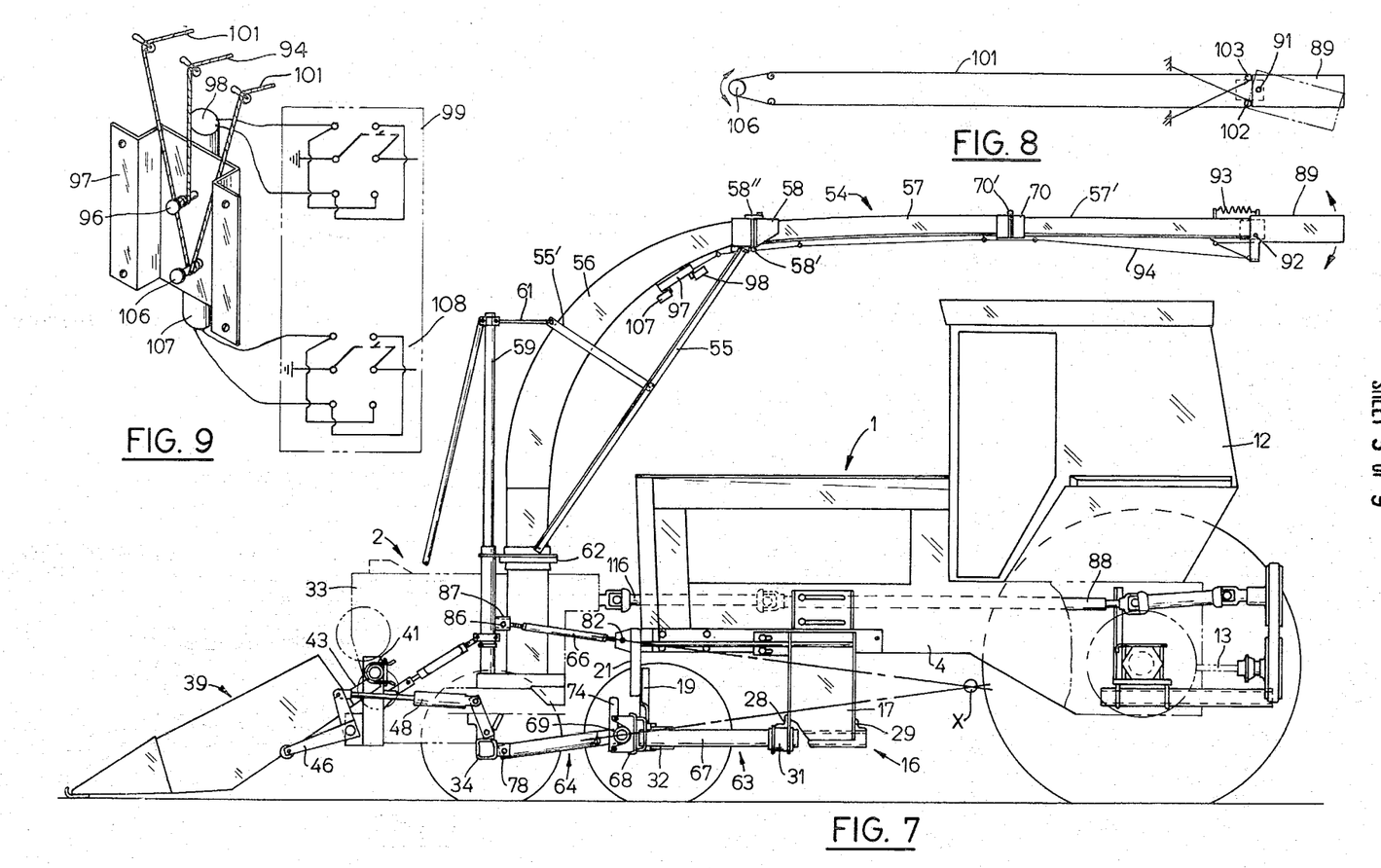
FIG. 7 is an enlarged side elevation of the tractor-harvester combination shown in FIG. 1, the near wheels of the tractor and harvester unit being omitted for purposes of exposure.
FIG. 8 is a schematic view of a control rigging for a deflector cap.
FIG. 9 is a diagram of an actuating mechanism for the control rigging shown in FIG. 8.

Sidewise back and forth adjustment of the cap 89 about the pivot axis 91 is effected by a rope 101 which is anchored at both ends on the deflector section 57' and is trained as shown in FIG. 8 around pulleys 102, 103 on the cap 89, and along the underside of the deflector sections 57, 56 to a small drum 106 about which it is looped a few times. An electric motor 107 is suitably geared to the drum 106 and, like the motor 96, is reversibly controlled by a double pole, double throw switch 108 in the tractor cab.

Figure 15:
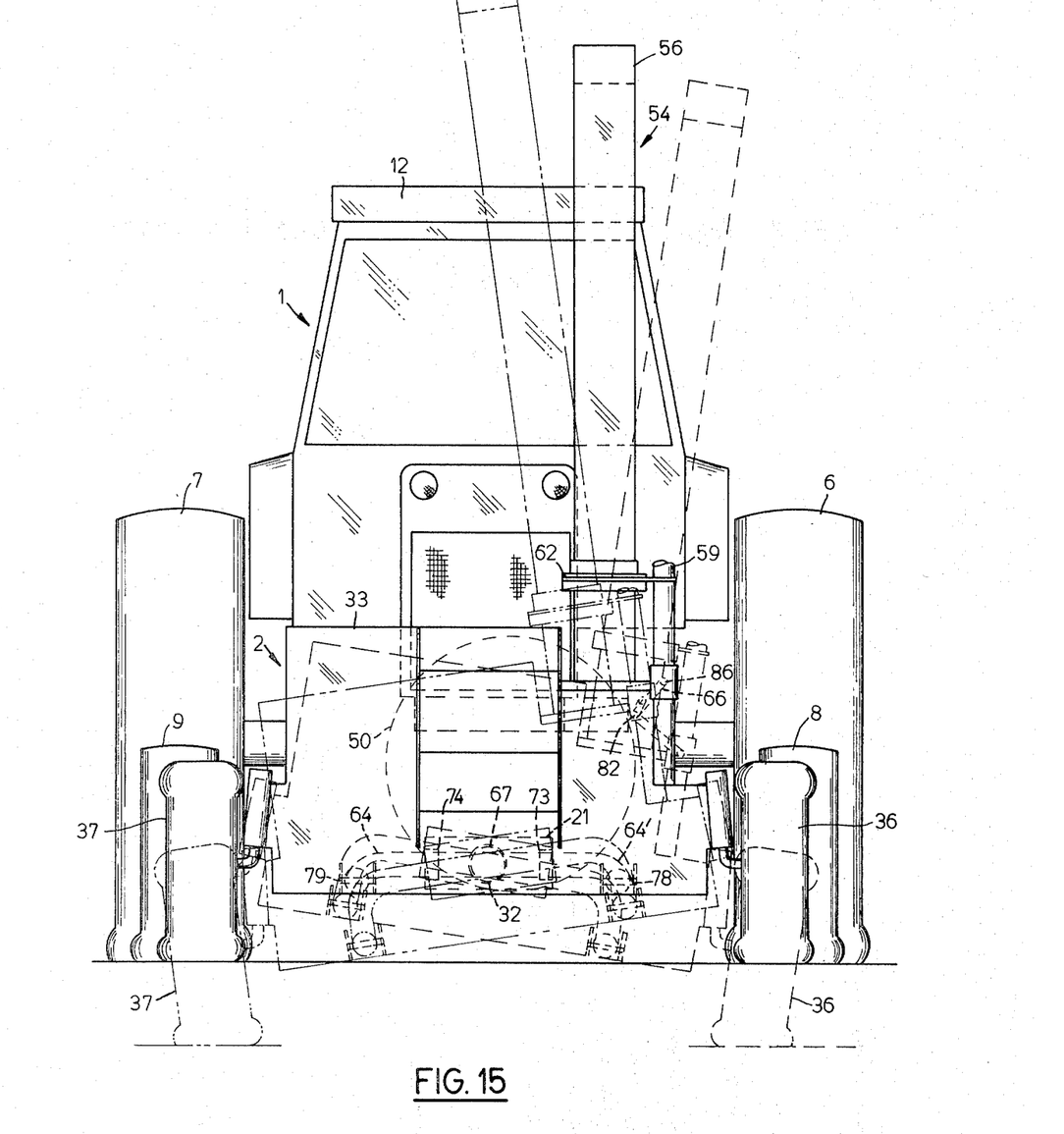
FIG. 15 is a somewhat diagrammatic enlarged front view of the equipment shown in FIG. 1, illustrating a tilted position of the harvester component in dotted lines, and another in dash-dotted lines.

FIGS. 10 and 15 show the corn harvester unit 2 in different positions of adjustment relative to the tractor. Rocking of the bell crank levers 46 and 47 (FIG. 11) about their pivot axis 41 (FIG. 10) may swing the corn gathering attachment 39 from the full line to the dotted line position in FIG. 10. Travel of both harvester supporting wheels 36 and 37 together over a ground ridge may swing the entire harvester about its virtual pivot center X from the full line to the dash-dotted line position in FIG. 10; dropping of the harvester wheel 36 into a ground depression may swing the entire harvester about the axis of the bearings 31, 32 in FIG. 11, from the full line to the dotted line position in FIG. 15; and dropping of the harvester wheel 37 into a ground depression may swing the entire harvester about the axis of the bearings 31, 32 in FIG. 11 from the full line to the dash-dotted line position in FIG. 15. Lateral swinging of the harvester in either direction about the axis of the bearings 31, 32 also swings the guide link 66 about the virtual pivot center X closer to or farther away from the vertical center plane A–B, as the case may be. The material discharge from the rear end of the deflector 54 will thus remain beamed into the wagon 3 during travel of the tractor-harvester combination and trailing wagon over ground irregularities normally encountered during the harvesting operation.

I claim:

1. The combination of a farm tractor; an auxiliary frame structure secured to the body of said tractor in underlying relation to the forward part thereof, a T-shaped coupling member; bearing means embracing the stem portion of said coupling member and mounted on said auxiliary frame structure so as to rotatably position said stem portion in lengthwise extending relation to said tractor and place the transverse head portion of said coupling member next to the forward end of said tractor; a bail shaped coupling member having a bight portion journalled on said head portion of said T-shaped coupling member for pivotal movement on axis extending transversely of the axis of said bearing means; a push type wheel supported harvester unit pivotally connected to the free ends said bail shaped coupling member on an axis extending transversely of said harvester unit; and a guide link swingably connected at its opposite ends to said auxiliary frame structure and to said harvester unit, respectively, in vertically spaced relation to said bail shaped coupling member.

2. The combination set forth in claim 1, wherein releasable pivot means are operatively interposed between said transverse head portion of said T-shaped coupling member and the bight portion of said bail shaped coupling member for swingably interconnecting said T-shaped and said bail shaped coupling members on an axis extending transversely to said stem portion of said T-shaped coupling member.

3. The combination set forth in claim 1, wherein said guide link is located in elevated relation to said bail shaped coupling member in proximity to one of the side arms of the latter.

4. The combination set forth in claim 3 wherein pivot means for connecting one end of said guide link to said auxiliary frame structure are located at a predetermined elevation with respect to the longitudinal axis on which said T-shaped coupling member is swingable relative to said auxiliary frame structure, and wherein pivot means for connecting the other end of said guide link to said harvester unit are located at a predetermined elevation with respect to said transverse axis of pivotal connection between said bail shaped coupling member and said harvester unit, said first named elevation being substantially shorter than said second named elevation.

5. The combination set forth in claim 4 wherein said pivot means for connecting one end of said guide link to said auxiliary frame structure is spaced from a vertical longitudinal center plane through said tractor and harvester unit a shorter transverse distance than the spacing between said center plane and the pivot means connecting the other end of said link to said harvester unit.

6. The combination of a farm tractor, a push type harvester unit positioned forwardly of said tractor in longitudinally aligned, vertically floating and laterally tiltable relation thereto; and articulated coupling means connecting said harvester unit with said tractor for up and down swinging movement relative thereto about a virtual pivot center in rearwardly spaced relation to the front end of said tractor; said coupling means comprising a first couping element having a pivotal connection with said tractor on a fore and aft extending axis, a second coupling element having a pivotal connection with said first coupling element on an axis extending transversely of said fore and aft extending axis, pivot means connecting said second coupling element with said harvester unit on an axis extending transversely of the latter, and guide means operatively interposed between said tractor and harvester unit so as to provide said virtual pivot center for said harvester unit.

7. The combination set forth in claim 6, wherein said guide means comprise a link member having rearward and forward pivot centers on said tractor and harvester unit, respectively, at substantial transverse distances from and at the same side of a vertical, longitudinal center plane through said tractor and harvester unit; said rearward pivot center being located at a predetermined elevation with respect to said fore and aft extending pivot axis of said first coupling element, and said forward pivot center being located above the transverse axis on which said second coupling element is connected to said harvester unit so that said forward pivot center will be spaced from said transverse axis a distance which is greater than said elevation of said rearward pivot center.

8. The combination set forth in claim 7 wherein said rearward pivot center of said link member is spaced from said center plane a shorter distance than said forward pivot center of said link member.

9. The combination of a farm tractor; a push type harvester unit of the ensilage cutter type positioned forwardly of said tractor in longitudinally aligned, vertically floating and laterally tiltable relation thereto; and articulated coupling means connecting said harvester unit with said tractor for up and down swinging movement relative thereto about a virtual pivot center in rearwardly spaced relation to the front end of said tractor; said coupling means comprising a first coupling element having a pivotal connection with said tractor on a fore and aft extending axis, a second coupling element having a pivotal connection with said first coupling element on an axis extending transversely of said fore and aft extending axis, pivot means connecting said second coupling element with said harvester unit on an axis extending transversely of the latter, and guide means operatively interposed between said tractor and harvester unit so as to provide said virtual pivot center for said harvester unit; and said harvester unit including a deflector structure extending rearwardly over said tractor for conveying cut crop material to a rearward, elevated discharge point.

10. The combination set forth in claim 9 and further comprising a cap member having a universal pivot connection with the discharge end of said deflector structure, and actuating means for said cap member operable to selectively swing the latter about said pivot connection to vertically and laterally adjusted positions.

* * * * *